United States Patent
Spanel et al.

(10) Patent No.: US 9,631,623 B2
(45) Date of Patent: Apr. 25, 2017

(54) STEPPED PARTING JOINT ON A TRANSMISSION HOUSING OF A FLUID MACHINE

(75) Inventors: Axel Spanel, Duisburg (DE); Jan Weule, Duisburg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 816 days.

(21) Appl. No.: 13/982,785

(22) PCT Filed: Jan. 19, 2012

(86) PCT No.: PCT/EP2012/050806
§ 371 (c)(1),
(2), (4) Date: Jul. 31, 2013

(87) PCT Pub. No.: WO2012/104153
PCT Pub. Date: Aug. 9, 2012

(65) Prior Publication Data
US 2013/0315707 A1  Nov. 28, 2013

(30) Foreign Application Priority Data
Feb. 2, 2011 (DE) .................. 10 2011 003 525

(51) Int. Cl.
F04D 29/42 (2006.01)
F04D 17/12 (2006.01)
(Continued)

(52) U.S. Cl.
CPC ............ *F04D 17/12* (2013.01); *F04D 25/02* (2013.01); *F04D 25/163* (2013.01);
(Continued)

(58) Field of Classification Search
CPC ........ F04D 25/02; F04D 25/163; F04D 17/12; F04D 29/4206; F04D 29/4226
See application file for complete search history.

(56) References Cited

U.S. PATENT DOCUMENTS 1,862,512 A * 6/1932 Short ...................... F16H 1/206
74/606 R
3,826,587 A * 7/1974 Hornschuch .......... F04D 25/163
415/122.1
(Continued)

FOREIGN PATENT DOCUMENTS

DE 3441699 A1 5/1986
DE 4003482 A1 * 8/1991 ............. F04D 25/02
(Continued)

*Primary Examiner* — John K Fristoe, Jr.
*Assistant Examiner* — Woody Lee, Jr.

(57) ABSTRACT

A divisible housing of a fluid machine for a transmission to be received in the divisible housing is provided. The transmission provided for receiving in the divisible housing includes a large wheel and at least two pinion shafts which are in engagement with the large wheel. The divisible housing includes a first housing element and a second housing element which is connected to the first housing element via a parting joint. The at least two pinion shafts may be received in the parting joint. The parting joint includes a parting joint step, the at least two pinion shafts being receivable in the parting joint on both sides of the parting joint step.

12 Claims, 3 Drawing Sheets

(51) Int. Cl.
*F04D 25/02* (2006.01)
*F04D 25/16* (2006.01)
*F16H 57/02* (2012.01)

(52) U.S. Cl.
CPC ..... *F04D 29/4206* (2013.01); *F04D 29/4226* (2013.01); *F16H 57/02* (2013.01); *F16H 2057/02008* (2013.01)

(56) References Cited

U.S. PATENT DOCUMENTS

| | | | |
|---|---|---|---|
| 5,156,576 | A | 10/1992 | Johnson |
| 5,287,769 | A | 2/1994 | Von Kaler |
| 5,335,496 | A | 8/1994 | Azuma |
| 7,559,200 | B2 * | 7/2009 | Rodehau ............... F04D 25/163 60/605.1 |

FOREIGN PATENT DOCUMENTS

| | | | | |
|---|---|---|---|---|
| DE | 4003482 | C2 | 11/1991 | |
| DE | 4241141 | A1 * | 6/1994 | ........... F04D 25/163 |
| DE | EP 1067291 | A1 * | 1/2001 | ............. F04D 25/02 |
| DE | 10134245 | A1 | 2/2003 | |
| DE | 102005002701 | A1 | 7/2006 | |
| DE | 102005002702 | A1 | 7/2006 | |
| EP | 0440902 | A1 | 8/1991 | |
| EP | 1067291 | A1 | 1/2001 | |
| EP | 2128448 | A2 | 12/2009 | |
| FR | 706698 | A | 6/1931 | |
| RU | 2002119 | C1 | 10/1993 | |

* cited by examiner

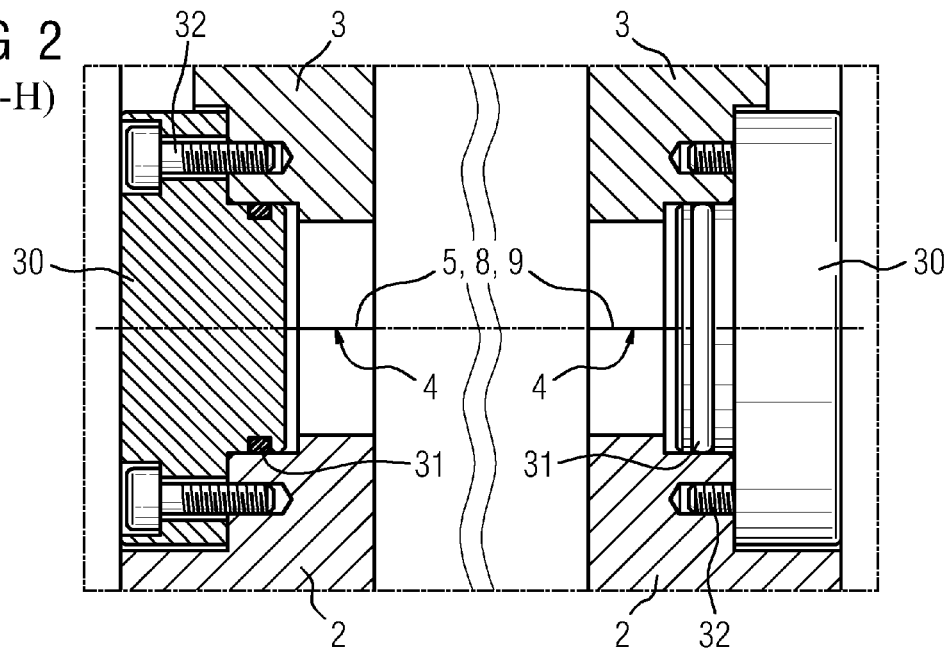
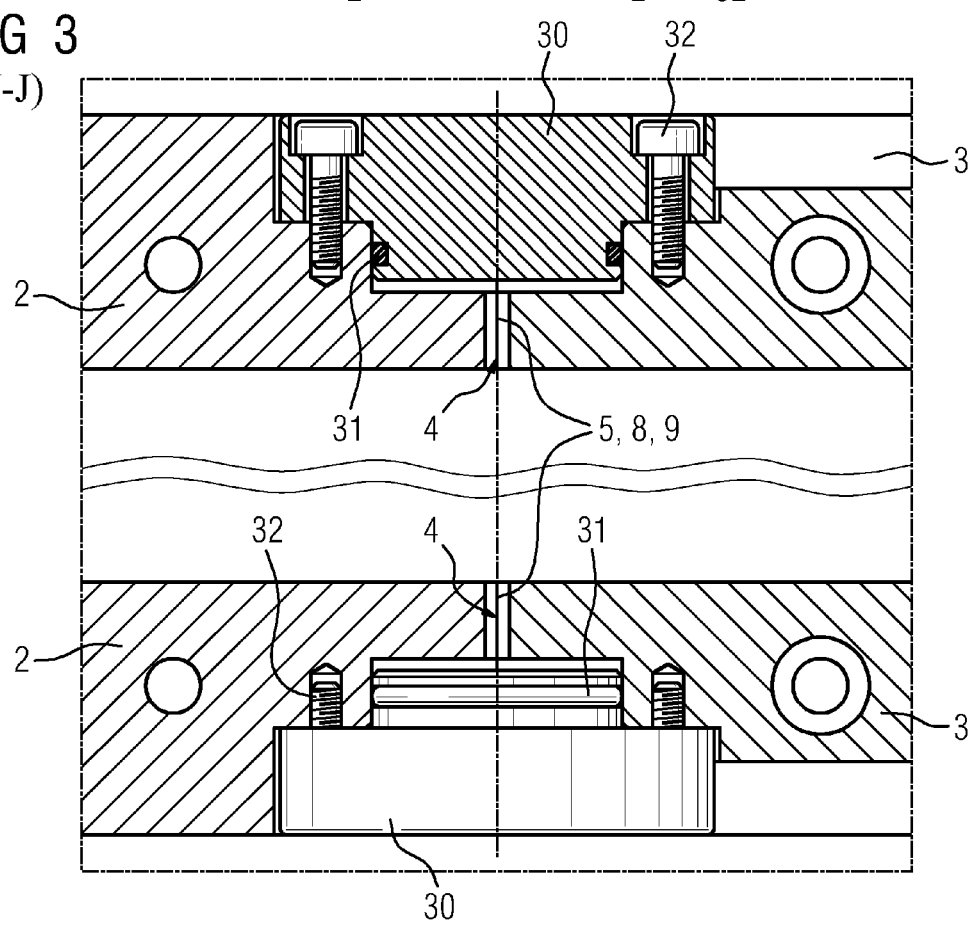

STEPPED PARTING JOINT ON A TRANSMISSION HOUSING OF A FLUID MACHINE

CROSS REFERENCE TO RELATED APPLICATIONS

This application is the US National Stage of International Application No. PCT/EP2012/050806 filed Jan. 19, 2012 and claims benefit thereof, the entire content of which is hereby incorporated herein by reference. The International Application claims priority to the German application No. 10 2011 003525.7 DE filed Feb. 2, 2011, the entire contents of which is hereby incorporated herein by reference.

FIELD OF INVENTION

The invention relates to a divisible housing of a fluid machine for a transmission, such as, for example, a divisible housing of a transmission turbocompressor.

BACKGROUND OF INVENTION

Compressors or fluid-compressing devices are used in various industrial sectors for various applications in which compression of fluids, in particular (process) gases, is involved. Known examples of this are turbocompressors in mobile industrial applications, such as in exhaust gas turbochargers or in jet engines, or else in stationary industrial applications, such as transmissions or transmission turbocompressors for air separation.

In such a turbocompressor, which operates continuously in its working mode, the pressure rise (compression) of the fluid is brought about in that an angular momentum of the fluid from inlet to outlet is increased by a rotating impellor, having radially extending blades, of the turbocompressor as a result of the rotation of the blades. Here, that is to say in such a compressor stage, the pressure and temperature of the fluid rise, while the relative (flow) velocity of the fluid in the impellor or turboimpellor falls.

In order to achieve as high a pressure rise or compression of the fluid as possible, a plurality of such compressor stages may be connected in series.

In terms of the forms of construction of turbocompressors, a distinction is made between radial and axial compressors.

In the axial compressor, the fluid to be compressed, for example a process gas, flows through the compressor in a direction parallel to the axis (axial direction).

In the radial compressor, the gas flows axially into the impellor of the compressor stage and is then deflected outward (radially, radial direction). In multistage radial compressors, therefore, flow deflection becomes necessary after each stage.

Combined constructions of axial and radial compressors suck in with their axial stages large volume flows which are compressed to high pressures in the following radial stages.

While single-shaft machines are mostly used, in (multistage) transmission turbocompressors (also referred to briefly below as simply transmission compressors) the individual compressor stages are grouped around a large wheel, a plurality of parallel (pinion) shafts, which each carry one or two impellors (turboimpellors arranged at free shaft ends of the pinion shafts) accommodated in spiral housings implemented as housing attachments, being driven by a large driving gearwheel, a large wheel, mounted in the housing.

Such a transmission compressor is known as a transmission compressor from Siemens with the designation STC-GC, used for air separation, and is likewise known from EP 1 067 291 A1.

In a transmission compressor, the drive and therefore the transfer of power from the large wheel to the shafts or pinion shafts take place by means of interengaging or intermeshing toothings on the large wheel and pinion shaft. Desired step-ups or step-up ratios (power stages) in the individual transmission stages are implemented via different numbers of teeth of the toothings or different reference diameters. That is to say, the individual pinion shafts are coupled to the large wheel and to one another in terms of toothing geometry and pinion shaft center position (mid-point or axis of rotation of a pinion shaft).

If a plurality of pinion shafts are arranged around the large wheel, a compromise must be found between ideal and implementable step-up ratios. A critically determining and limiting variable is in this case the available and/or implementable construction space, in particular the space available for the flow-routing components (spiral housings) arranged as housing attachments outside the housing at the pinion shaft ends.

The coupling of the pinion shafts to the large wheel via toothing geometry and the pinion shaft center position therefore assumes central importance in the development and design and also construction of transmission turbomachines. On account of the size ratios or size differences, that is to say because the large wheel is very much larger than the many times smaller pinion shafts to be arranged around the large wheel, there is, in particular, the question of the situation of the pinion shafts or their pinion shaft center positions.

In a conventional arrangement, two pinion shafts lie in a first undivided and horizontal parting joint with the large wheel. A third pinion shaft is arranged above the large wheel in a second undivided and horizontal parting joint.

In this arrangement, on the overall three pinion shafts, there are six free shaft ends which, equipped with turboimpellors, make it possible to implement a multistage transmission turbomachine with six possible process stages.

In order to increase the compression performance of such a six-stage transmission compressor, it is known to increase the number of process stages, for example by means of a fourth pinion shaft.

What is required in this case is to accommodate this fourth pinion shaft in the housing of a transmission compressor efficiently and in a straightforward way in terms of construction and assembly.

Two approaches for arranging such a fourth pinion shaft are known:

a) Arrangement of the fourth pinion shaft above the large wheel together with the third pinion shaft in the second undivided and horizontal parting joint.

If the fourth pinion shaft is arranged above the large wheel, the available construction space has to be shared with the third pinion shaft. In arranging the third and the fourth pinion shaft in the parting joint, collisions of flow-routing components (spiral housings) arranged on the outside are critical. So that interfaces with adjacent functions (bearing accommodation, spiral tie-up) can be defined, the parting joint is designed to be undivided and horizontal.

In order to implement various step-ups in the transmission stages in such an arrangement, it is known to use a multiply toothed large wheel, for example as an integrated unit with a second large wheel. That is to say, such a multiply toothed large wheel has (axially) offset toothings which mesh in each case with different pinion shafts.

Although a multiplicity of additional step-up ratios and pinion shaft center positions coupled to them are possible as a result, this nevertheless entails a high outlay in terms of manufacture and cost.

b) Arrangement of the fourth pinion shaft below the large wheel in a version as a plug-in pinion shaft.

If the fourth pinion shaft is arranged below the large wheel, the construction space does not have to be shared with an adjacent pinion shaft, but there is no parting joint there which can be used for mounting purposes.

It is possible to mount the fourth pinion shaft only by pushing (plugging) it in laterally (plug-in pinion shaft).

As a result, the pinion shaft center positions can be selected virtually freely, taking into account the spiral housings of the first parting joint. However, here too, implementation entails considerable extra outlay (mounting parts, mounting operation).

SUMMARY OF INVENTION

The object on which the invention is based is, therefore, to specify a housing for a transmission of a fluid machine, in particular for a transmission of a transmission compressor, which mitigates the disadvantages of the prior art, in particular allows different step-up ratios of the transmission at a low outlay in terms of manufacture and cost, and which can be implemented simply and cost-effectively, and so as to be optimized in terms of construction space, and can also be mounted simply and cost-effectively.

The object is achieved by means of a divisible housing of a fluid machine for a transmission receivable or to be received in the divisible housing, having the features according to the independent patent claim.

The divisible housing of the fluid machine comprises at least one first housing element and one second housing element connected to the first housing element via a parting joint, for example a (housing) top box and a (housing) cover.

The transmission to be provided for reception in the divisible housing has a large wheel and at least two pinion shafts which are in engagement with the large wheel.

In this context, "in engagement" may mean that the large wheel and the pinion shafts have interengaging or intermeshing toothings. For example, the toothing may be designed as spur or helical or spiral toothing.

According to the invention, the parting joint is designed in such a way that the at least two pinion shafts can be received in the parting joint, for example in bearing accommodations or bearing shells to be arranged there. Further, according to the invention, the parting joint has a parting joint jump, with the at least two pinion shafts being receivable in the parting joint on both sides of the parting joint jump.

A parting joint jump is to be understood in this context to mean that the parting joint forms two different horizontal levels on both sides of a transition point forming the parting joint jump. The height difference thereby implementable within the parting joint may be arbitrary within wide ranges, for example 10 mm to 1000 mm or 20 mm to 500 mm, preferably 30 mm to 100 mm, in particular 60 mm. Limitation occurs, at most, due to the size of the large wheel or the size of the pinion shafts and/or due to collisions with attachments which possibly arise as a result.

Preferably, these different levels in the parting joint or this parting joint jump may be implemented in that the first housing element and the second housing element have in each case a step corresponding to one another and forming the parting joint jump or else a plurality of steps, for example similar to a staircase.

Also, the different levels or the parting joint jump may be implemented by differently designed or formed transition points, such as profiles which are inclined, rise or fall in a straight line and/or are curved or rounded in the two housing elements corresponding to one another.

The parting joint jump according to the invention makes it possible to form in the parting joint two different horizontal planes which can be used for mounting the at least two pinion shafts, in engagement with the large wheel, on different horizontal levels or in different horizontal planes in a single parting joint.

If the at least two pinion shafts are arranged in engagement with the large wheel on both sides of the parting joint jump or transition point, in particular the step in the parting joint, it thereby becomes possible to arrange the at least two pinion shafts in a single parting joint, while at the same time with different pinion shaft center positions. The reference circles of the at least two pinion shafts only have to touch the reference circle of the large wheel (which can take place at any different height because of the parting joint jump); the previous requirement whereby the pinion shaft center points of the at least two pinion shafts which are in engagement with the large wheel lie in the same horizontal plane (undivided and horizontal parting joint) may be dispensed with.

The reception of the at least two pinion shafts in a single parting joint is advantageous for cost and mounting reasons and is further utilized via the parting joint jump; via the implementable different pinion shaft center positions, because the construction space possibilities are thereby extended, different step-up ratios (variability of the step-ups) can be implemented in the transmission, for example without the outlay of multiple toothing on the large wheel. In simplified terms, the invention makes it possible to have in the configuration an additional degree of (design) freedom which can be utilized for the implementation of different step-up ratios.

Preferred developments of the invention may be gathered from the dependent claims.

In a preferred development, the first housing element and the second housing element have in each case a step corresponding to one another and forming the parting joint jump. Such steps in the housing elements, for example cast in by means of appropriate casting methods in the case of steel and/or (re)machined in the case of steel parts, may have any step heights which are limited merely by the size of the large wheel, sizes of the at least two pinion shafts and/or the size of the divisible housing itself.

In a further preferred refinement, the transmission is received in the divisible housing, with the at least two pinion shafts being received in the parting joint on both sides of the parting joint jump or transition point, in particular on both sides of a step forming the parting joint jump, for example in bearing accommodations or bearing shells. In order to be in engagement with the large wheel, the reference circles of the two pinion shafts touch the reference circle of the large wheel, although at a different horizontal height, that is to say the pinion shaft center positions lie in different horizontal planes.

In this case, there may preferably be provision, as a development, whereby at least one axis (of rotation) of the two axes (of rotation) of the at least two pinion shafts is arranged above an axis (of rotation) of the large wheel in the divisible housing. Especially preferably, there may also be provision whereby both axes (of rotation) of the at least two pinion shafts are arranged above the axis (of rotation) of the large wheel (101). More construction space is consequently available below the axis (of rotation) of the large wheel in the divisible housing, for example for further pinion shafts which are in engagement with the large wheel or with a further large wheel which, in particular, is coupled to or is in engagement with the abovementioned large wheel.

According to a preferred development, the first housing element and the second housing element are pinned (centering) to one another and/or screwed to one another.

The housing elements may also be made from metal, in particular steel.

Further, there may preferably be provision whereby the divisible housing has a third housing element which is connected to the first housing element or to the second housing element via a further parting joint. Thus, for example, the first housing element may be a top box, the second housing element a cover and the third housing element a bottom box of the divisible housing.

There may also be provision whereby further housing attachments are mounted onto the divisible housing, for example flow-routing components arranged on the outside, such as spiral housings, and/or spiral tie-ups and/or bearing accommodations.

In a further preferred refinement, the transmission has at least two further pinion shafts which are in engagement with the large wheel or with a further large wheel. Especially preferably, there may be provision here whereby the large wheel or the further large wheel and the at least two further pinion shafts are arranged in the further parting joint.

Furthermore, there may be provision whereby the first housing element and the second housing element are a top box and a parting joint cover of the transmission housing and/or whereby the first housing element and the second housing element are aligned and/or centered with one another via step faces, offset vertically to one another, of a step forming the parting joint jump.

In a preferred development, there is provision whereby the parting joint is sealed off, using a sealing lens, in particular a sealing lens which is arranged over the parting joint jump and, in particular, is screwed (on) from outside and/or is arranged, countersunk, at the parting joint jump.

There may in this case be provision, further, whereby the sealing lens has at least one O-ring, in particular a radially and/or axially acting O-ring.

For the efficient and long-term operation of the transmission to be received in the divisible housing, the sealing off of the parting joint is of major importance, in particular an oil seal, for example, in the case of oil sump lubrication implemented in the housing.

The sealing lens which can be provided for this purpose and which is screwed, countersunk, over the parting joint step and is equipped with an inserted O-ring achieves an efficient sealing action simply and cost-effectively.

The production of the sealing lens seat on the transmission housing or parting joint jump is preferably carried out during the spindling out of the bearing seats and does not necessitate any further machining step. Owing to the countersunk arrangement of the sealing lens, the latter presents no obstacle to adjacent components; a device for spiral setting can still be mounted.

In order to increase the sealing action of the sealing lens further, one or more additional axially acting O-rings may be used. Furthermore, these have the advantage that the sealing direction acts counter to the clamping force of the screw connection of the parting joint.

Also, the design and the mounting of the screw connection of the parting joint remain unaffected, irrespective of the O-ring arrangement in the sealing lens.

According to a preferred development, the transmission is a transmission of a fluid machine or turbomachine, for example of a turbine, turbocompressor, multistage transmission compressor or pump.

In an especially preferred development, the divisible housing is part of a multistage transmission compressor plant which has eight stages (four pinion shafts) with radial impellers and spiral housings. The sealing off of the compressor stages with respect to the divisible (transmission) housing may take place by means of Kohler rings. An electric motor may serve as the drive. The divisible housing has a bottom box, a top box and a cover. The bottom box and the top box are connected via an undivided and horizontal parting joint. The top box and the cover are connected via a stepped parting joint. Two pinion shafts which are equipped at the free shaft ends with turboimpellors are arranged in each case both in the stepped first parting joint and in the undivided and horizontal second parting joint. Furthermore, the shaft of the large wheel is also arranged in the undivided and horizontal second parting joint and between the two pinion shafts arranged there.

BRIEF DESCRIPTION OF THE DRAWINGS

An exemplary embodiment of the invention is illustrated in figures which are explained in more detail below and in which:

FIG. 2 shows a view of a section along a sectional line, designated by H-H, in FIG. 1A;

FIG. 3 shows a view of a section along a sectional line, designated by J-J, in FIG. 1A;

Exemplary embodiment: stepped parting joint on a divided transmission housing for a transmission of a multistage transmission compressor.

DETAILED DESCRIPTION OF INVENTION

Figure 1B:
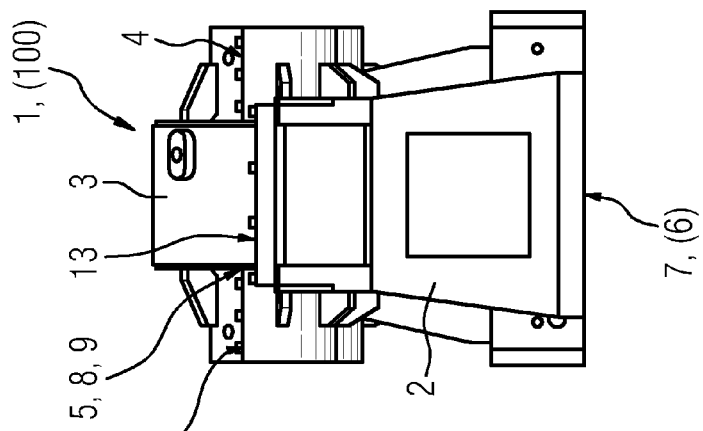
FIG. 1A and FIG. 1B show two views of a divided housing, having a cover and a top box, for a transmission of a multistage transmission compressor.
Figure 1A:
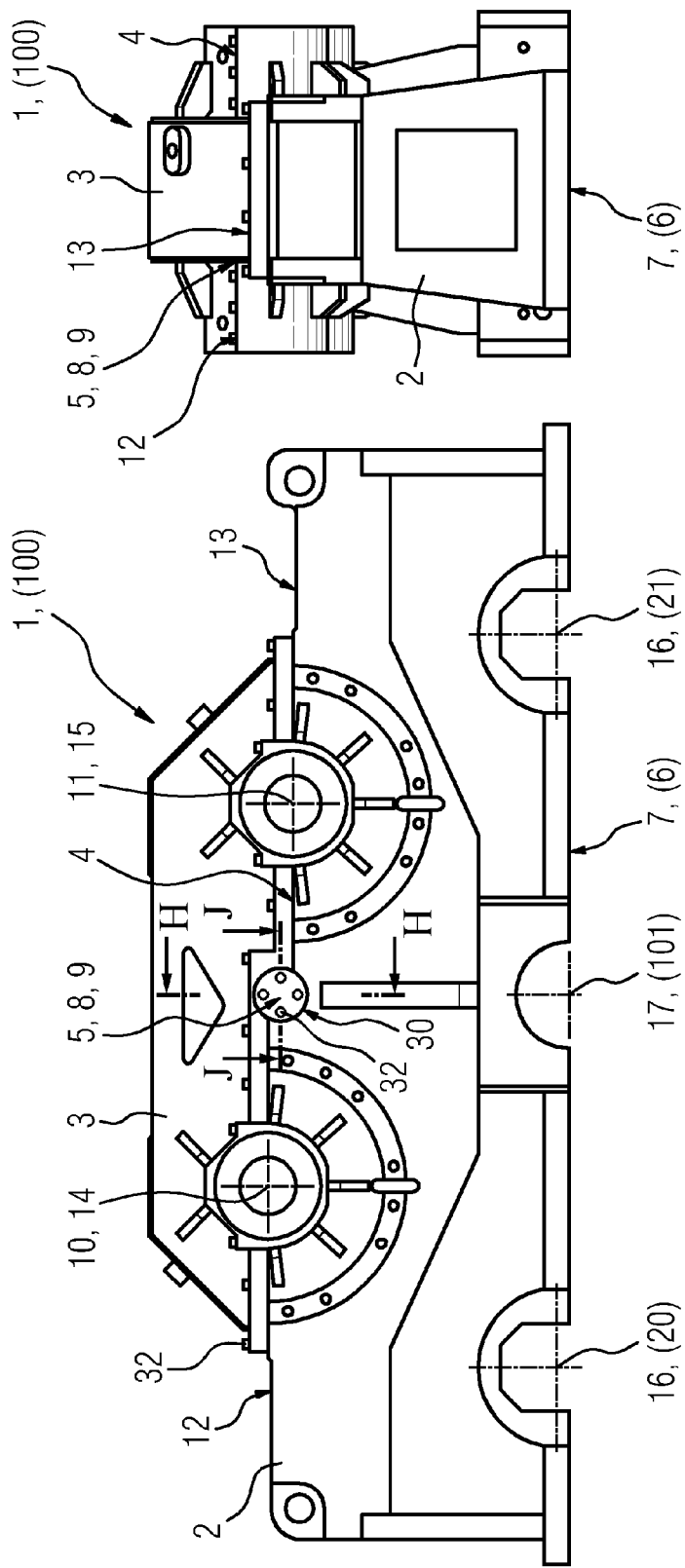
Figure 4:
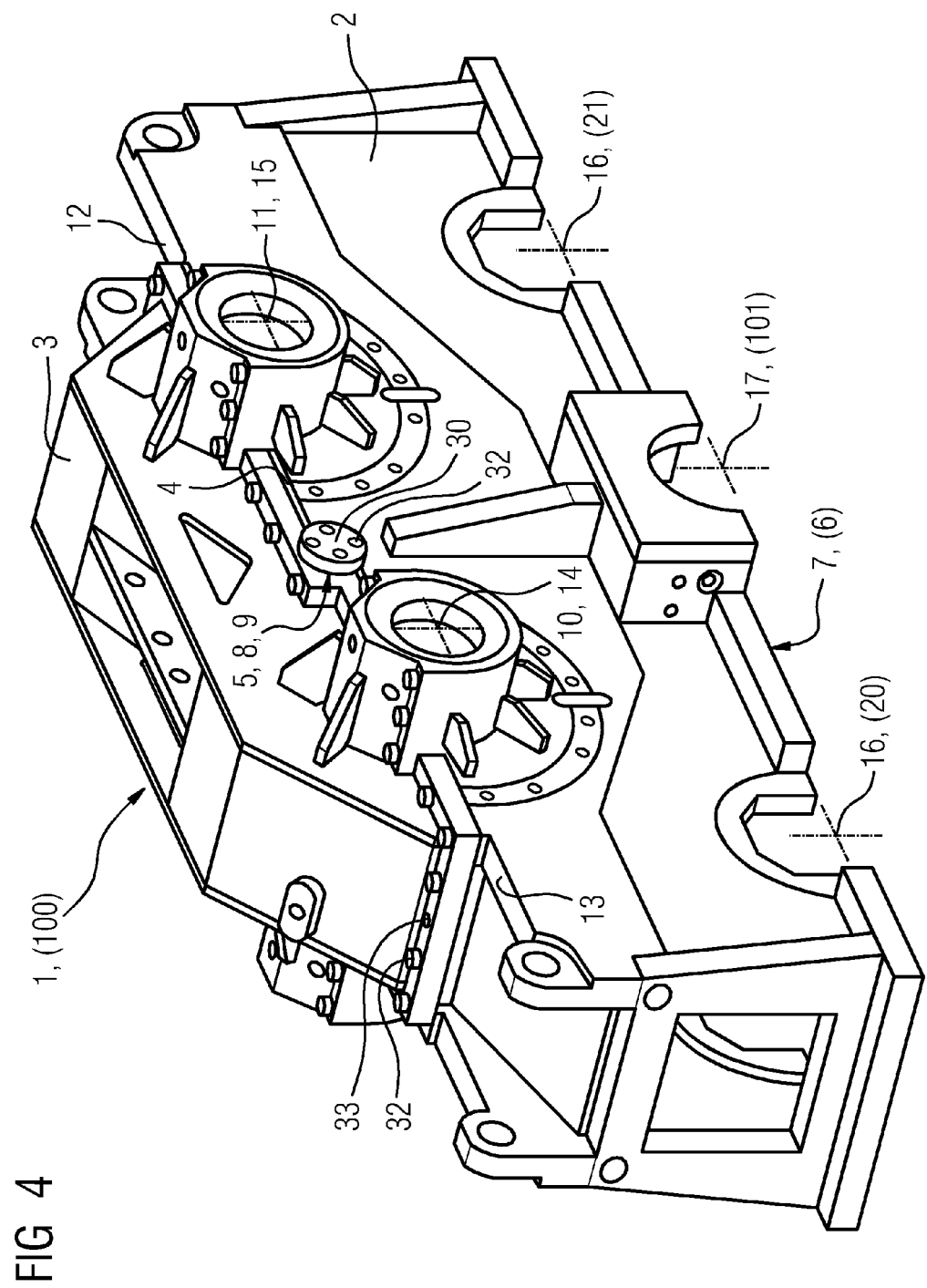
FIG. 4 shows a three-dimensional illustration of the divided housing for a transmission of a multistage transmission compressor according to FIGS. 1A and 1B.

FIGS. 1A and 1B (front and side view) and also FIG. 3 (3D view) show views, a top box 2 and a cover 3, of a divided housing 1 (transmission housing) for a transmission 100 of a multistage transmission compressor intended for air separation.

The divided housing 1 has the illustrated cover 3 and the illustrated top box 2 and also a bottom box 6 (not illustrated), all preferably made from steel. The cover 3 and top box 2 are connected to one another via a first, stepped parting joint 4; the top box 2 and bottom box 6 are connected to one another via a second, horizontal and nonstepped parting joint 7.

The multistage transmission compressor is composed of eight (compressor) stages which are implemented via a transmission 100 received in the divided housing 1 and having four pinion shafts 10, 11, 20, 21 of the transmission 101 which are in engagement with a large wheel 101 of the transmission 100. At the free ends of the four pinion shafts 10, 11, 20, 21 are arranged turboimpellors which are received in spiral housings (flow-routing components) arranged on the outside with respect to the transmission housing 1.

All four pinion shafts 10, 11, 20, 21 are arranged around the large wheel 101 and are in engagement with the large wheel 101 via toothings. In this case, the first pinion shaft 10 and second pinion shaft 11 (stages 5 to 8) are arranged above the large wheel 101; the third pinion shaft 20 and fourth pinion shaft 21 (stages 1 to 4) are arranged level with the large wheel 101. In order to allow the efficient engagement of the pinion shafts 10, 11, 20, 21, the pinion shafts 10, 11, 20, 21 are arranged, with regard to their distance from the large wheel 101, in such a way that the reference circles of the pinion shafts 10, 11, 20, 21 in each case touch the reference circle of the large wheel 101.

The drive of the large wheel 101 or of the shaft of the large wheel 101 takes place via an electric motor. The compressor stages are sealed off with respect to the transmission housing 1 by means of Kohler rings.

As FIGS. 1A and 1B and also FIG. 3 show, the top box 2 has on its underside, which together with the top side of the bottom box 6 forms the second, unstepped and horizontal parting joint 7, the receptacles, that is to say the shaft seats, for the shaft of the large wheel 101 and for the third pinion shaft 20 and fourth pinion shaft 21. All three shafts 20, 21, (101) lie in this case in one horizontal plane in accordance with the second, unstepped and horizontal parting joint 7.

As FIGS. 1A and 1B and also FIG. 3 also show, the top box 2 has on its top side, which together with the underside of the cover 3 forms the first, stepped parting joint 4, the receptacles, that is to say the shaft seats, for the first pinion shaft 10 and second pinion shaft 11. The corresponding receptacles for the first pinion shaft 10 and second pinion shaft 11 are also provided in the underside of the cover 3.

The first, stepped parting joint 4 has a jump point 5 arranged approximately in the middle of the housing 1 with respect to the longitudinal extent of the housing 1 and having approximately a height of about 60 mm. This jump point 5 is formed by corresponding steps 8 both in the top box 2 of the housing 1 and, correspondingly, in the cover 3 of the housing 1.

As a result, the first pinion shaft 10 and second pinion shaft 11 lie above the large wheel 101 and together in the first, stepped parting joint 4, this being beneficial for mounting and cost reasons. However, the first pinion shaft 10 and second pinion shaft 11 no longer lie in the same horizontal plane, but instead, correspondingly to the step 8 formed, in different horizontal planes 12, 13 or at different heights.

The reference circles of the first pinion shaft 10 and second pinion shaft 11 and of the large wheel 101 still touch one another.

In order to make it possible to align the top box 2 and cover 3, the vertical step faces 9 are offset with respect to one another. The top box 2 and cover 3 are pinned 33 by means of centering pins and screwed 32. The bottom box and top box are also pinned 33 and screwed 32 together.

Sealing off of the stepped parting joint 4 by means of a sealing lens 30 with an O-ring 31.

The lubrication of the transmission 100 arranged in the housing 1 is carried out by oil sump lubrication, the oil seal of the first, stepped parting joint 4, in particular of the parting joint jump 5 located there or of the steps 6 in the top box 2 and cover 3, assuming central importance.

The transmission housing 1 provides for the use of a sealing lens 30 for this purpose, as shown in FIGS. 2 and 3 in detail or in sections (H-H, J-J).

Said sealing lens 30 is screwed 32, countersunk, over the parting joint step 5 from outside. The sealing action is achieved via an inserted O-ring 31.

The production of the countersunk lens seat on the transmission housing 1 is carried out during the spindling out of the bearing seats of the first pinion shaft 10 and second pinion shaft 11 and does not necessitate any further machining step.

Owing to the countersunk arrangement of the sealing lens 30, the latter presents no obstacle to adjacent components; the device for spiral setting can still be mounted.

The design and mounting of the parting joint screw connection 32 remain unaffected, irrespective of the O-ring arrangement 31 in the sealing lens 30.

The invention claimed is:

1. A divisible housing of a fluid machine for a transmission receivable in the divisible housing and having a large wheel and at least two pinion shafts which are in engagement with the large wheel, the divisible housing comprising:
a first housing element; and
a second housing element connected to the first housing element via a single continuous parting joint,
wherein the at least two pinion shafts being receivable in the parting joint,
wherein the parting joint includes a parting joint jump, which forms two different horizontal levels in the parting joint,
wherein the parting joint provides a continuous mating of the first housing element and the second housing element
wherein the at least two pinion shafts are receivable in the parting joint on both sides of the parting joint jump at the two different horizontal levels, and
wherein the at least two different horizontal levels each lie at different vertical heights from one another.

2. The divisible housing of a fluid machine as claimed in claim 1,
wherein the first housing element and the second housing element each include a step corresponding to one another and forming the parting joint jump.

3. The divisible housing of a fluid machine as claimed in claim 2,
wherein the first housing element and the second housing element are a top box and a parting joint cover, respectfully, of the transmission housing, or
wherein the first housing element and the second housing element are aligned or centered with one another via a plurality of step faces, offset vertically to one another, of the step forming the parting joint jump.

4. The divisible housing of a fluid machine as claimed in claim 1,
wherein the transmission is received in the divisible housing, the at least two pinion shafts being received in the parting joint on both sides of the parting joint jump.

5. The divisible housing of a fluid machine as claimed in claim 4, wherein one axis of rotation of two axes of rotation of the at least two pinion shafts is arranged above an axis of rotation of the large wheel in the divisible housing.

6. The divisible housing of a fluid machine as claimed in claim 1, wherein the first housing element and the second housing element are pinned to one another and screwed to one another.

7. The divisible housing of a fluid machine as claimed in claim 1, wherein the first housing element and the second housing element are pinned to one another or screwed to one another.

8. The divisible housing of a fluid machine as claimed in claim 1, wherein the divisible housing further includes a third housing element which is connected to the first housing element or to the second housing element via a further parting joint.

9. The divisible housing of a fluid machine as claimed in claim 8,
   wherein the transmission includes at least two further pinion shafts which are in engagement with the large wheel or with a further large wheel, and
   wherein the large wheel or the further large wheel and the at least two further pinion shafts being arranged in the further parting joint.

10. The divisible housing of a fluid machine as claimed in claim 1,
    wherein the first housing element and the second housing element are a top box and a parting joint cover, respectfully, of the transmission housing, and
    wherein the first housing element and the second housing element are aligned and centered with one another via a plurality of step faces, offset vertically to one another, of a step forming the parting joint jump.

11. The divisible housing of a fluid machine as claimed in claim 1, wherein the parting joint is sealed off, using a sealing lens arranged over the parting joint jump.

12. The divisible housing of a fluid machine as claimed in claim 1, wherein the transmission is a transmission of a turbine, turbocompressor, multistage transmission compressor or pump.

\* \* \* \* \*